United States Patent
Chuang et al.

(10) Patent No.: US 9,461,381 B1
(45) Date of Patent: Oct. 4, 2016

(54) ELECTRONIC CARD CONNECTOR WITH METAL PINS OF TERMINALS CONNECTED BY AN ELECTRONIC CARD RECEIVED THEREIN

(71) Applicant: HTC CORPORATION, Taoyuan (TW)

(72) Inventors: I-Cheng Chuang, Taoyuan (TW); Chih-Wei Tu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 14/644,113

(22) Filed: Mar. 10, 2015

(51) Int. Cl.
*H01R 3/00* (2006.01)
*H01R 12/70* (2011.01)
*H01R 13/66* (2006.01)
*H01R 13/71* (2006.01)

(52) U.S. Cl.
CPC ........ *H01R 12/7076* (2013.01); *H01R 13/665* (2013.01); *H01R 13/71* (2013.01)

(58) Field of Classification Search
CPC  H01R 13/465; H01R 13/7032; H01R 13/71; H01R 13/7175
USPC ................... 439/488, 489, 629, 630
See application file for complete search history.

(56) References Cited

U.S. PATENT DOCUMENTS

| | | | | |
|---|---|---|---|---|
| 6,050,857 A * | 4/2000 | Lok | ................... | H01R 13/2442 439/630 |
| 6,749,450 B1 * | 6/2004 | Chen | ................... | H01R 27/00 439/188 |
| 7,112,077 B2 * | 9/2006 | Kikuchi | ................ | H01R 12/7094 439/188 |
| 7,128,613 B1 * | 10/2006 | Lee | ................... | H01R 12/716 439/489 |
| 7,896,670 B1 * | 3/2011 | Gao | ................... | G06K 7/0021 439/159 |
| 8,398,416 B2 * | 3/2013 | Tseng | ................ | H01R 13/6658 439/188 |
| 8,523,614 B2 * | 9/2013 | Matsunaga | ......... | H01R 12/716 439/630 |
| 8,821,191 B2 * | 9/2014 | Soo | ................... | H01R 12/55 439/630 |
| 8,905,779 B2 * | 12/2014 | Little | ................... | H01R 13/641 439/489 |
| 2008/0102680 A1 | 5/2008 | Chang et al. | | |
| 2012/0083316 A1 * | 4/2012 | Lee | ................... | G06K 7/0069 455/558 |
| 2012/0252240 A1 | 10/2012 | Yang | | |
| 2014/0315422 A1 * | 10/2014 | Hunt | ................... | H01R 4/64 439/489 |

* cited by examiner

*Primary Examiner* — Chandrika Prasad
(74) *Attorney, Agent, or Firm* — Masuvalley & Partners

(57) ABSTRACT

Electronic card connectors for receiving and electrically connecting with at least one electronic card are described. The electronic card connector includes a base having a plurality through holes, a frame, and a plurality of terminals which are adapted to pass through the through holes. The frame is configured to be assembled with the base to form a receiving recess. At least one of the plurality of terminals may include a plurality of metal pins. When the at least one electronic card is inserted into the receiving recess, one of the plurality of metal pins is electrically connected to the other one of the plurality of metal pins via a sensor unit.

16 Claims, 12 Drawing Sheets

ELECTRONIC CARD CONNECTOR WITH METAL PINS OF TERMINALS CONNECTED BY AN ELECTRONIC CARD RECEIVED THEREIN

FIELD OF THE INVENTION

The present invention provides an electronic card connector, and more particularly, to an electronic card connector in which the electronic card that has been installed and disposed can be determined in advance.

DESCRIPTION OF THE RELATED ART

For modern smart devices such as smart mobile phones or tablet computers, at least two gate numbers in the same smart device or the ability to adapt to electronic cards (e.g., SIM cards) of different specifications is important so that the products become more versatile for the user. A common practice adopted by the manufacturers is to dispose several electronic card connectors in one smart device to facilitate the user in switching between two or more communication networks.

In terms of functions, an electronic card connector should not only receive an electronic card and secure the electronic card from detaching, but also detect whether an electronic card has been inserted into the smart device by means of a sensing mechanism and circuits arranged on the electronic card connector.

First, electronic card connectors of common types are described as follows.

Common electronic card connectors are categorized into the push-pull type, the push-push type and the tray type. An electronic card connector of the push-pull type is provided with elastic metal pins at the lateral side of an electronic card receiving recess, and an electronic card can be inserted into and secured within the electronic card receiving recess by means of an elastic force provided by the metal pins.

For an electronic card connector of the push-push type, an elastic element is disposed at an end of the electronic card receiving recess, and when an electronic card is inserted into the electronic card receiving recess, the end of the electronic card comes into contact with the elastic element to establish an electrical connection therebetween. Therefore, the elastic element is used as a switch.

For an electronic card connector of the tray type, a tray element is disposed to place the electronic card thereon. The system determines whether an electronic card has been placed on the tray element by directly sensing the electrical connection state of a pin.

Additionally, using SIM cards as an example, the common SIM cards may be categorized into three types in terms of the size specifications: Mini SIM cards, Micro SIM cards and Nano SIM cards. A SIM card is provided with a plurality of contacts, and when the SIM card is inserted into the receiving recess of a SIM card connector, the contacts of the SIM card will be electrically connected with one of metal pins coupled to a circuit board and then electrically connected with another of the metal pins to read user information from the SIM card.

Therefore, when the smart device in the prior art is powered on, the system not only reads the receiving recesses in which a SIM card has been inserted, but also performs read retries on receiving recesses in which no SIM has been inserted to determine whether SIM cards have been inserted into the SIM card connectors.

However, although the read retrying helps to determine the electrical connection state of each SIM card receiving recess, each read retry performed on the receiving recesses in which no SIM card has been inserted additionally consumes a current of at least 0.6 mA, and this seriously reduces the standby time of the smart device.

Accordingly, it is important in the art to provide a solution that allows the system of a smart device to detect/know in advance which SIM card connectors have got a SIM card placed therein to avoid additional currents consumed in detection of receiving recesses in which no SIM card has been inserted.

CONTENTS OF THE INVENTION

An objective of the present invention is to provide an electronic card connector, which allows the sensing unit of a smart device with the electronic card connector installed therein to detect in advance which electronic card connector(s) has an electronic card placed therein before reading the electronic card. Thereby, additional currents that are possibly consumed in detection of receiving recesses in which no electronic card has been inserted are avoided and meanwhile, the standby time of the smart device that has the electronic card connector of the present invention placed therein is prolonged.

To achieve the aforesaid objective, the electronic card connector of the present invention comprises a base, a frame and a plurality of terminals. The base has a plurality of through holes; the frame is adapted to be assembled with the base to form a receiving recess; the plurality of terminals are adapted to pass through the through holes, and at least one of the terminals has a plurality of metal pins. When an electronic card is inserted into the receiving recess, one of the metal pins is adapted to be electrically connected with another of the metal pins via a sensing unit.

The detailed technology and preferred embodiments implemented for the subject invention are described in the following paragraphs accompanying the appended drawings for people skilled in this field to well appreciate the features of the claimed invention.

DESCRIPTION OF EMBODIMENTS

Figure 1A:
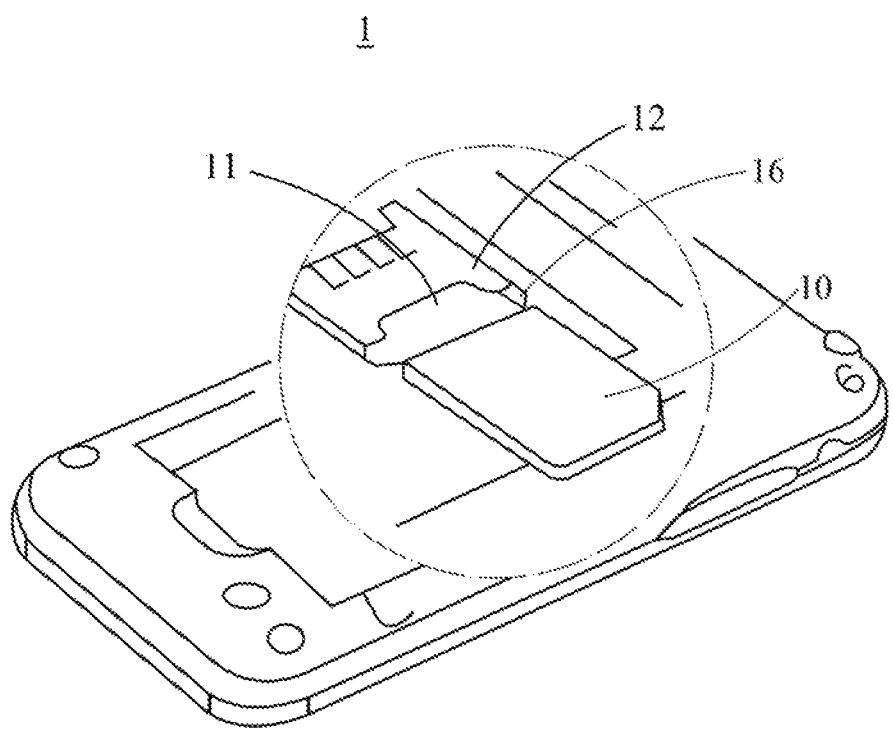
FIG. 1A is a schematic view of an electronic card connector according to the first embodiment of the present invention.

FIG. 1A shows a schematic view of an electronic card connector according to the first embodiment of the present invention. As shown in FIG. 1A, an electronic card connector in the first embodiment is a SIM card connector 1. The SIM card connector 1 is disposed within an electronic device, e.g., a card reader, a smartphone, or a tablet computer, etc.

Figure 1B:
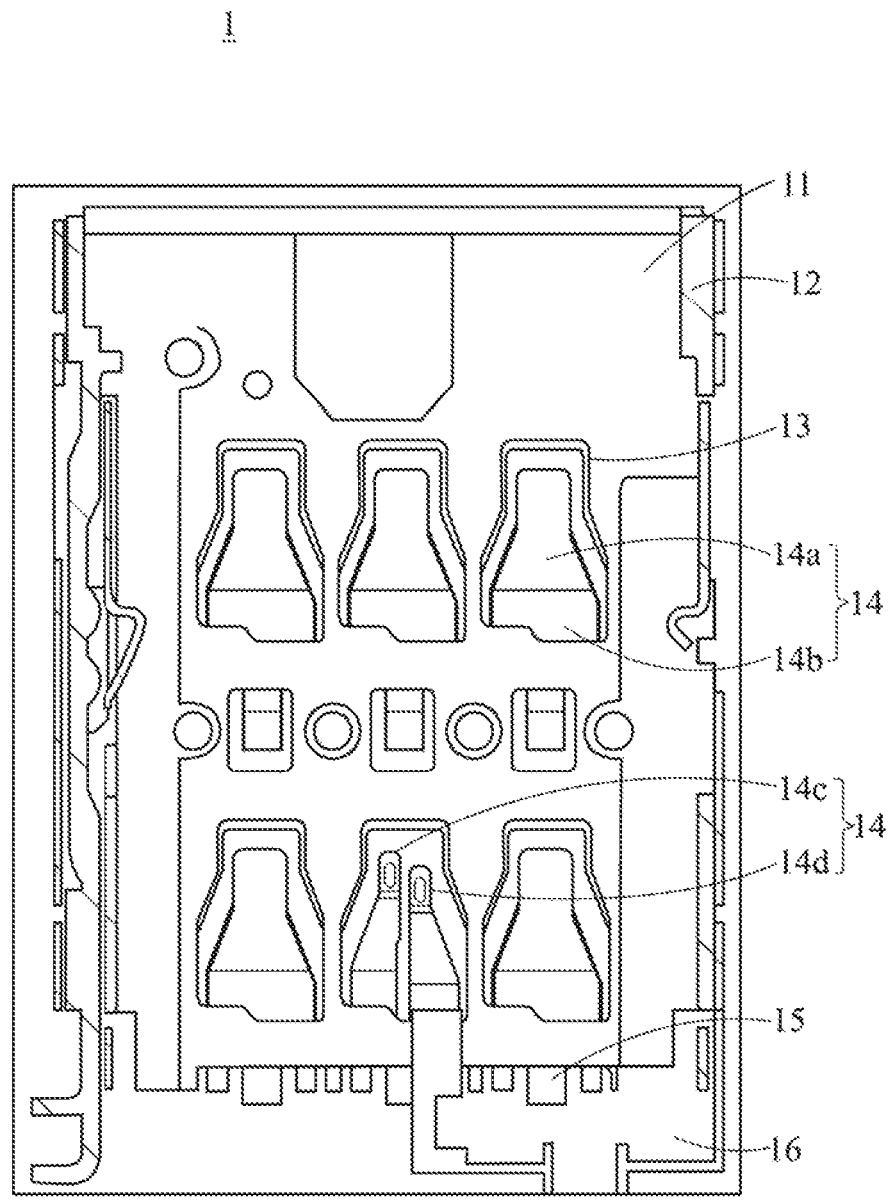
FIG. 1B is a schematic view of an electronic card connector of the push-pull type according to the present invention which is applied to a single slot.

FIG. 1B shows a schematic view of the SIM card connector of the present invention which is a SIM card connector of the push-pull type with a single slot.

As shown in FIG. 1B, the SIM card connector 1 in the first embodiment comprises a base 11, a frame 12 and a plurality of terminals 14. The frame 12 is adapted to be assembled with the base 11 to form a receiving recess 16, and the base 11 is provided with a plurality of through holes 13 so that at least one of the terminals 14 can pass through corresponding ones of the through holes 13. Each of the through holes 13 is sized to allow a part of the one terminal 14 to pass therethrough, and one of the terminals 14 has a plurality of metal pins 14c and 14d (as shown in FIG. 1B).

Thus, in the first embodiment, when a SIM card 10 is inserted into the receiving recess 16, a sensing unit (not shown) of the device will detect whether the plurality of terminals 14 are electrically connected with the SIM card 10. If the terminals 14 are electrically connected with the SIM card 10, then the sensing unit correspondingly transmits a signal indicating an electrical connection status so that one of the metal pins 14c and 14d can be electrically connected with another of the metal pins 14c and 14d depending on the determination result of the sensing unit. In other words, when the SIM card 10 is inserted into the receiving recess 16, the metal pin 14c is adapted to be electrically connected with the metal pin 14d via the sensing unit; or the metal pin 14d is adapted to be electrically connected with the metal pin 14c via the sensing unit. Further features of related elements will be sequentially described as follows.

Figure 1C:
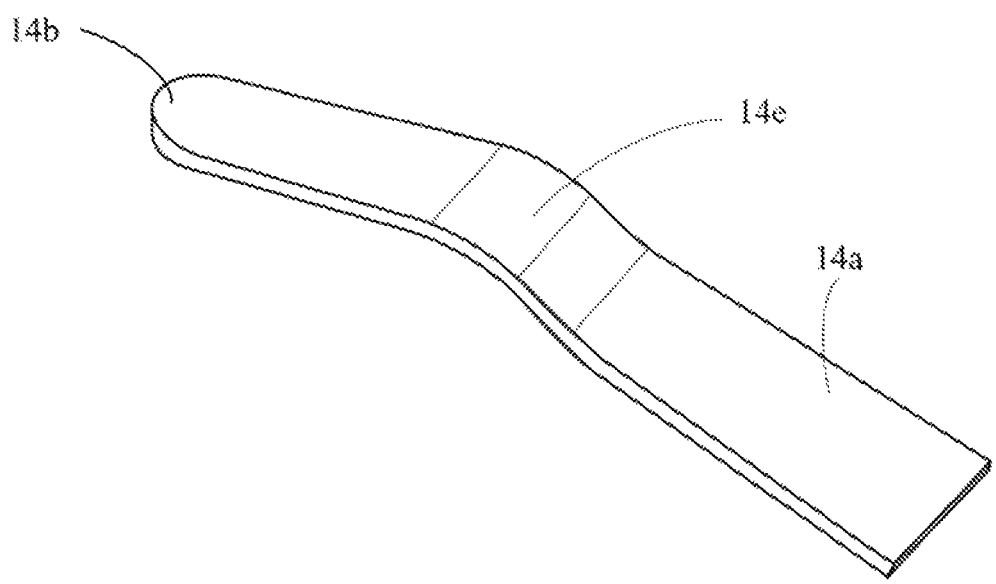
FIG. 1C is a schematic view of a metal terminal of the electronic card connector according to the present invention.

FIG. 1C is a schematic view illustrating the first implementation of the terminal 14 of the SIM card connector 1 according to the present invention. As shown in FIG. 1C, the terminal 14 has a front tail 14a and a back tail 14b, the front tail 14a extends towards the back tail 14b, and the back tail 14b is formed to have a bending length 14e relative to the front tail 14a. The terminal 14 is made of an elastic metal material, while the front tail 14a of the terminal 14 is coupled to a print circuit board (PCB) 15 by means of welding, tin soldering or conductive adhesive (see FIG. 1B). Further, each terminal 14 is provided with a corresponding through hole 13 so that the back tail 14b of the terminal 14 can pass through and extend out of the through hole 13 after the PCB 15 is mounted on the base 11. Moreover, when the SIM card 10 is inserted into the receiving recess 16, the SIM card 10 will make electrical contact with the back tail 14b of the terminal 14 of the SIM card connector 1.

Figure 1D:
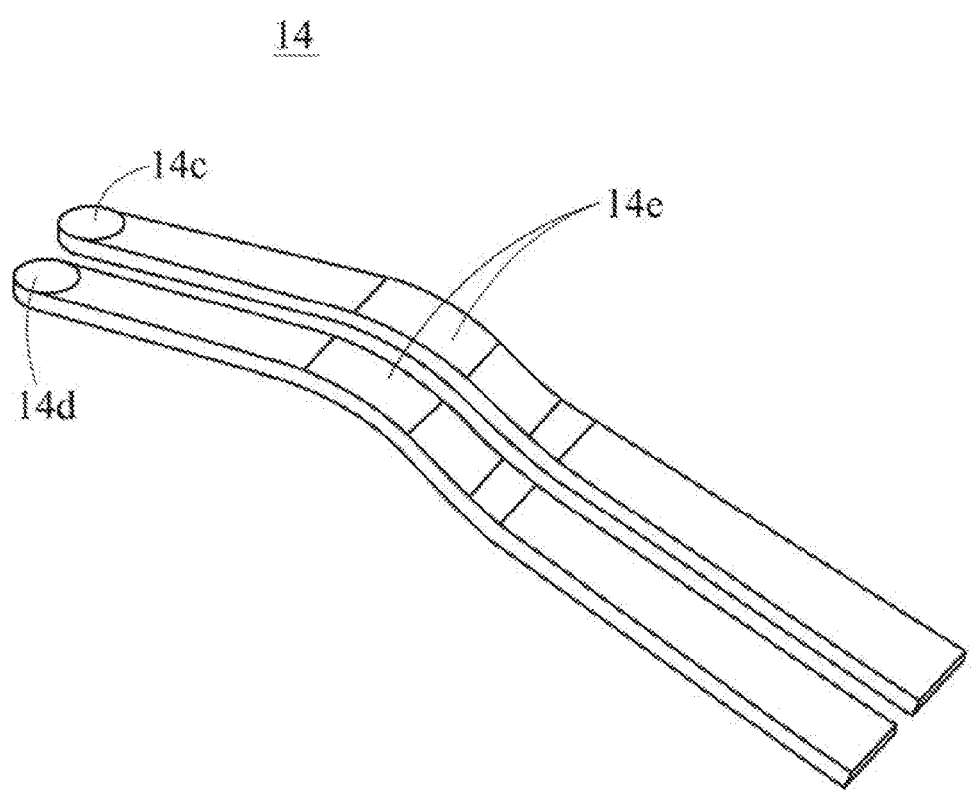
FIG. 1D is a schematic view of a plurality of metal pins of the electronic card connector according to the present invention.

FIG. 1D is a schematic view illustrating the second implementation of the terminal 14 of the SIM card connector 1 according to the present invention. The terminal 14, as shown in FIG. 1D, is a variation of the terminal 14 shown in FIG. 1C and differs from the terminal 14 shown in FIG. 1C in that at least one metal pin 14c and 14d with identical or different bending lengths 14e is formed at the back tail 14b. Moreover, when the SIM card 10 is inserted into the receiving recess 16, contacts on the SIM card 10 will make electrical contact with the metal pins 14c and 14d of the terminal 14 of the SIM card connector 1.

In the first embodiment, the metal pin 14c may be set to a Reset pin and a Ground pin. The metal pin 14d may be set to be a Detect pin. The Reset pin, Ground pin and Detect Pin are used as a signal input pin and/or signal output pin, and the electrical functions of the pins are designed by the actual applications of the peripheral components. It should be noted that the terms Reset pin, Detect pin, and Ground pin have conventional meaning in this art and one of ordinary skilled in the art will readily recognize these terms and their common definitions.

Therefore, a signal indicating an electrical connection status may be generated by the sensing unit after the SIM card 10 is inserted into the receiving recess 16 and the metal pin 14d makes electrical contact with the SIM card 10. This signal is used to determine whether the SIM card 10 is placed into the SIM card connector 1. After the signal indicating the electrical connection status is sensed by the sensing unit, the system may perform data reading/writing operations on the SIM card 10 if the information carried in the signal is "With Electronic Card".

On the contrary, if the SIM card 10 is not inserted into the SIM card connector 1, then the metal pin 14d will not make any contact with the contacts of the SIM card 10 and thus will not be able to be electrically connected to the metal pin 14c. As a result, there will be no signal indicating an electrical connection status that will be transmitted to the system.

Thus, the system will not perform any reading/writing operation on the SIM card 10 until the signal indicating the electrical connection status is received by the system. With such an arrangement, the system can know in advance whether the SIM card 10 is disposed within the SIM card connector 1 to avoid read retrying performed by the system on the SIM card receiving recess 16 to reduce power consumption of the system.

Figure 1E:
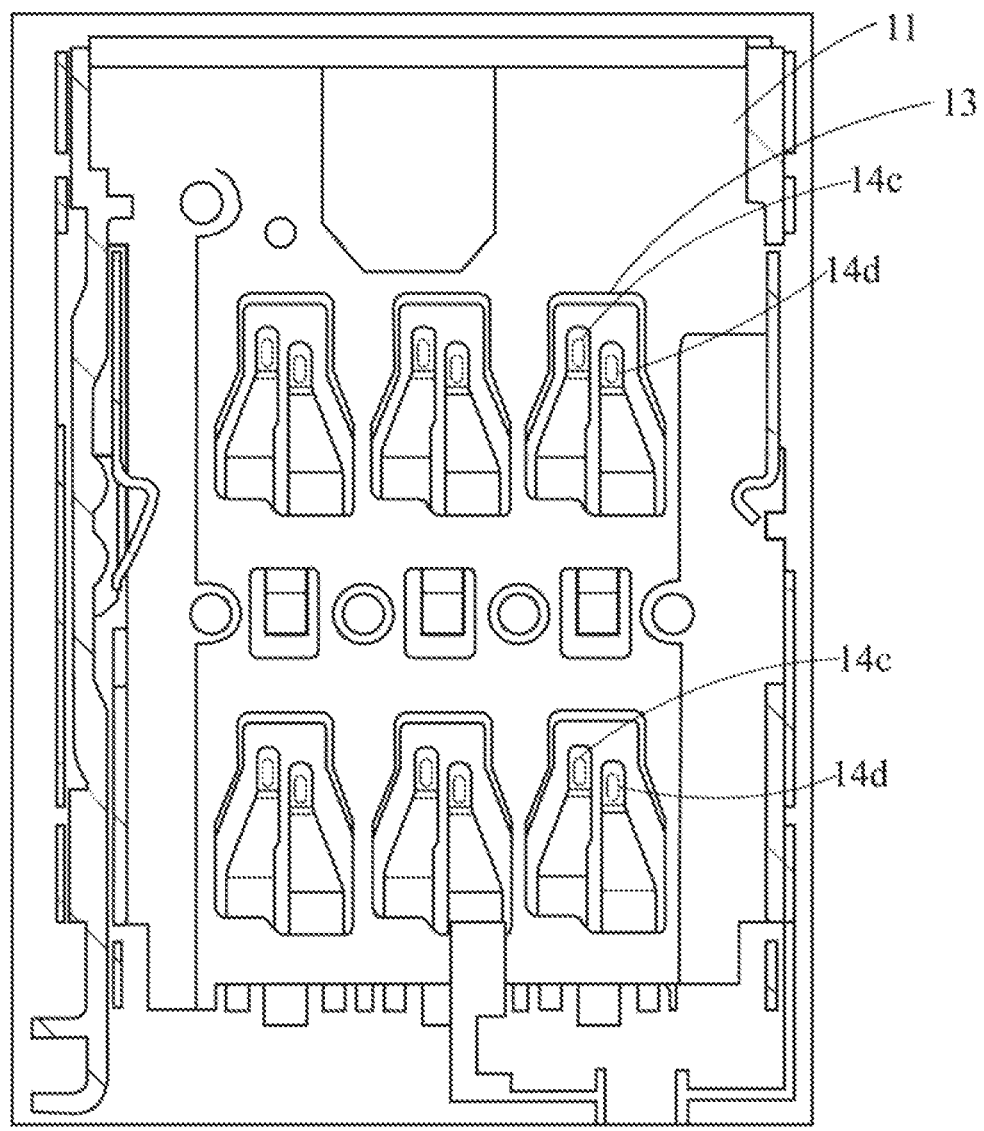
FIG. 1E is a schematic view of the plurality of metal pins of the electronic card connector in another configuration according to the present invention.

Additionally, as shown in FIG. 1E, the metal pins 14a-14d of the SIM card connector 1 may also have another configuration in the first embodiment of the present invention. That is, the terminals 14 are not limited to such an arrangement as shown in FIG. 1B that "only a single terminal 14 is provided with a plurality of metal pins 14a-14d", but instead, "each of all or part of the terminals 14 may be provided with a plurality of metal pins respectively" so that different metal pins can be used for other extended functions.

Figure 2:
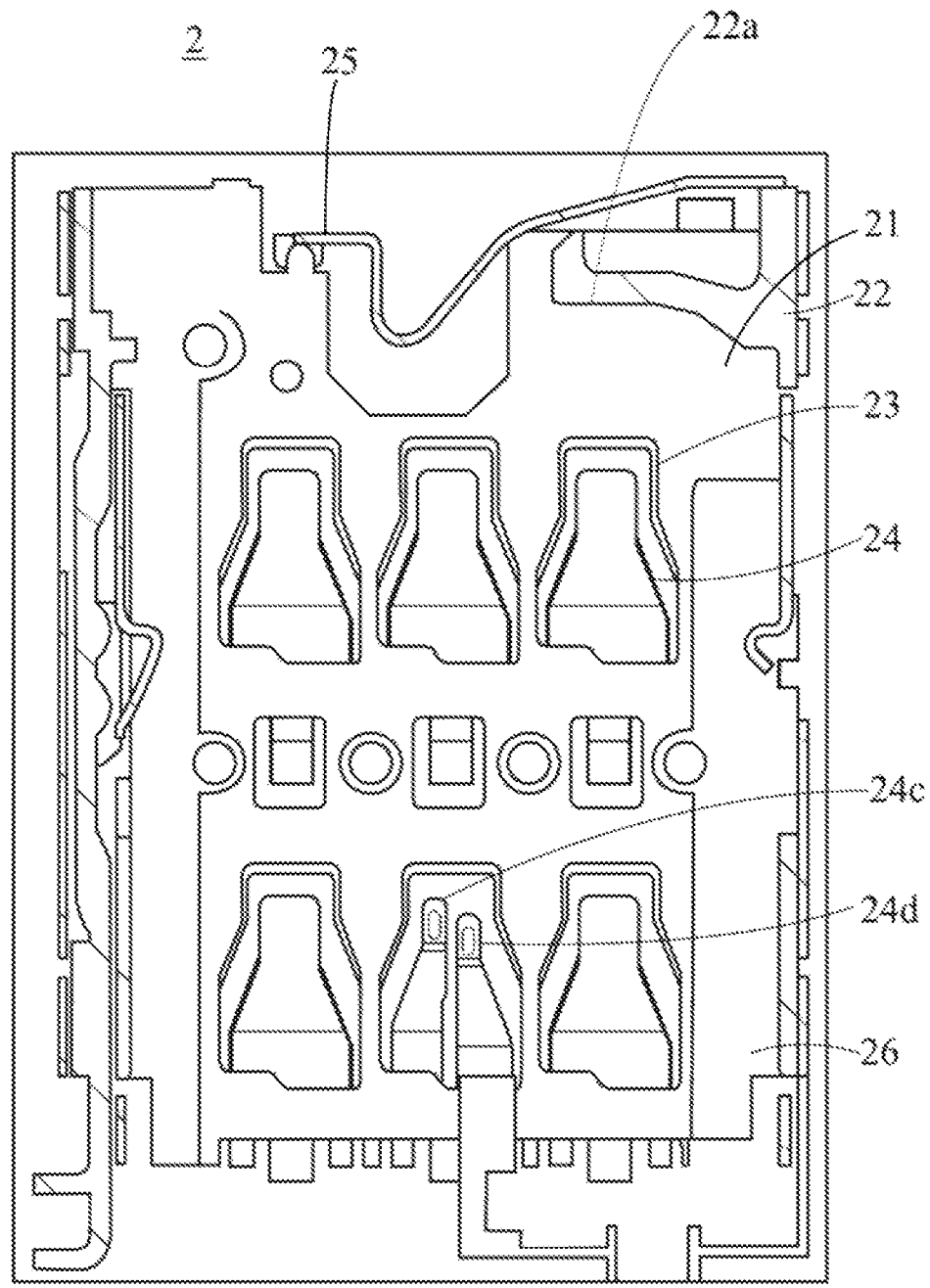
FIG. 2 is a schematic view of an electronic card connector of the push-push type according to the present invention which is applied to a single slot.

FIG. 2 illustrates a schematic view of an electronic card connector according to the second embodiment of the present invention.

As shown in FIG. 2, the electronic card connector in the second embodiment is a SIM card connector 2, and the SIM card connector 2 is a SIM card connector of the push-push type applied to a single slot. The SIM card connector 2 of the second embodiment is generally the same in structure as that of the first embodiment except that the SIM card connector 2 of the second embodiment further comprises an elastic sheet 25 with elasticity to fix or remove the SIM card.

In this way, a SIM card (not shown) inserted into a receiving recess 26 will abut against an end surface 22a of a frame 22 so that the SIM card can be tightly fixed within the receiving recess 26. When the SIM card is pushed into a receiving recess 26, a metal pin 24c (Ground pin/Reset pin) is electrically connected with the SIM card via the sensing unit, and a signal indicating an electrical connection status is generated and transmitted to the system. Thus, the system can determine that the SIM card receiving recess 26 has the SIM card placed therein and then perform data reading/writing operations on the SIM card.

On the contrary, if no SIM card is inserted into the SIM card connector 2, then the metal pin 24c will not be electrically connected with the metal pin 24d, and no signal will be transmitted to the system. With this arrangement, the system can know in advance whether the SIM card is placed into the SIM card receiving recess 26 to avoid read retrying performed by the system on the SIM card connector 2 during operation to reduce power consumption of the system.

Figure 3:
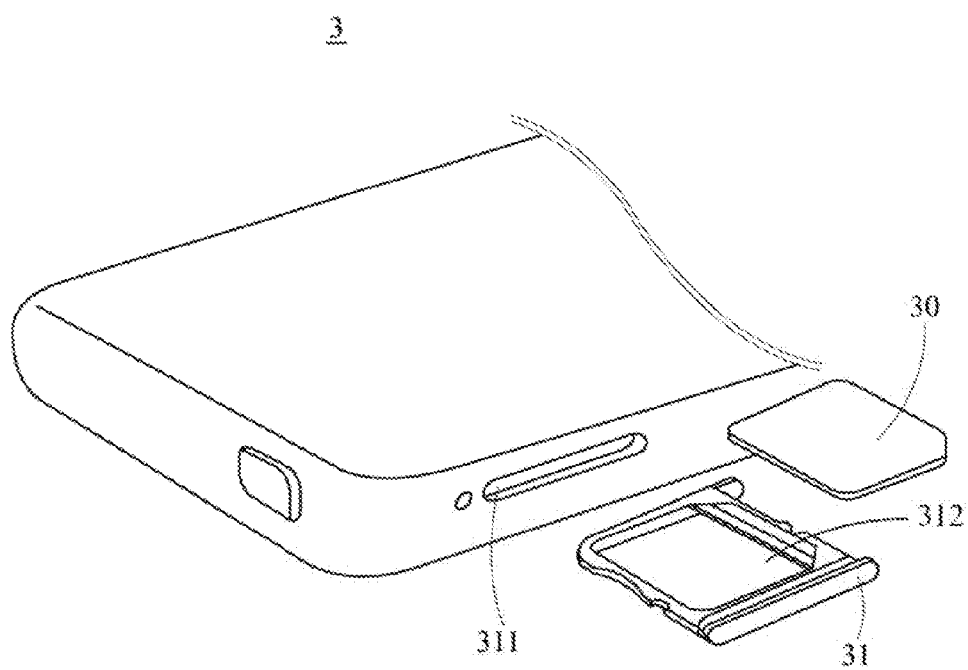
FIG. 3 is a schematic view of an electronic card connector of the tray type according to the present invention which is applied to a single slot.

FIG. 3 shows a schematic view of a SIM card connector 3 of the tray type according to the present invention which is applied to a single slot.

As shown in FIG. 3, the SIM card connector 3 in the third embodiment is a SIM card connector of the tray type applied to a single slot. A SIM tray 31 can be pushed into a receiving recess 311 after a SIM card 30 is placed on the SIM tray 31.

The structure of the SIM card connector 3 and the way to detect the SIM card 30 in the third embodiment are the same as those of the second embodiment, and the third embodiment differs from the second embodiment only in that the third embodiment further comprises the tray 31 (as shown in FIG. 3) but does not comprises the elastic sheet 25. Then, when the tray 31 with an electric card accommodating recess 312 is inserted into the receiving recess 311, the metal pin 24d makes contact with contacts of the SIM card 30 and thus, is electrically connected with the metal pin 24c.

The aforesaid first embodiment, the second embodiment and the third embodiment are all related to implementations where a single SIM card is applied to the SIM card connector. However, the following embodiments will disclose implementations related to SIM card connectors with multaille slots.

Figure 4A:
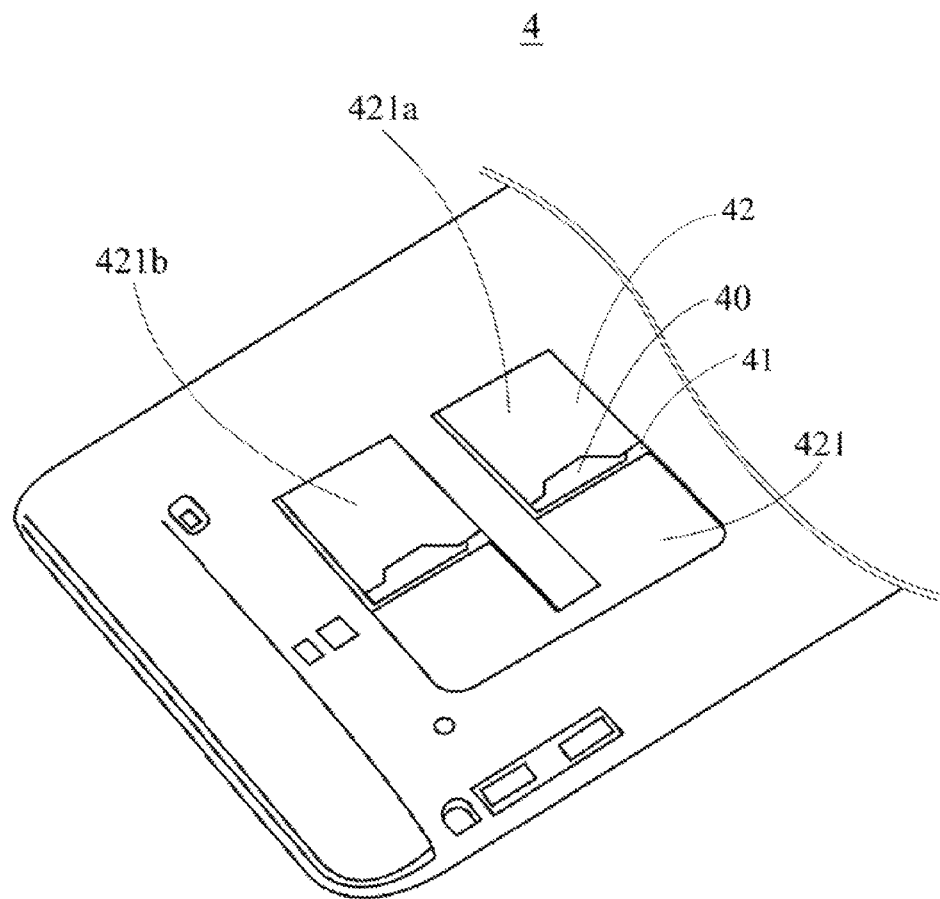
FIG. 4A is a schematic view of an electronic card connector according to the fourth embodiment of the present invention.
Figure 4B:
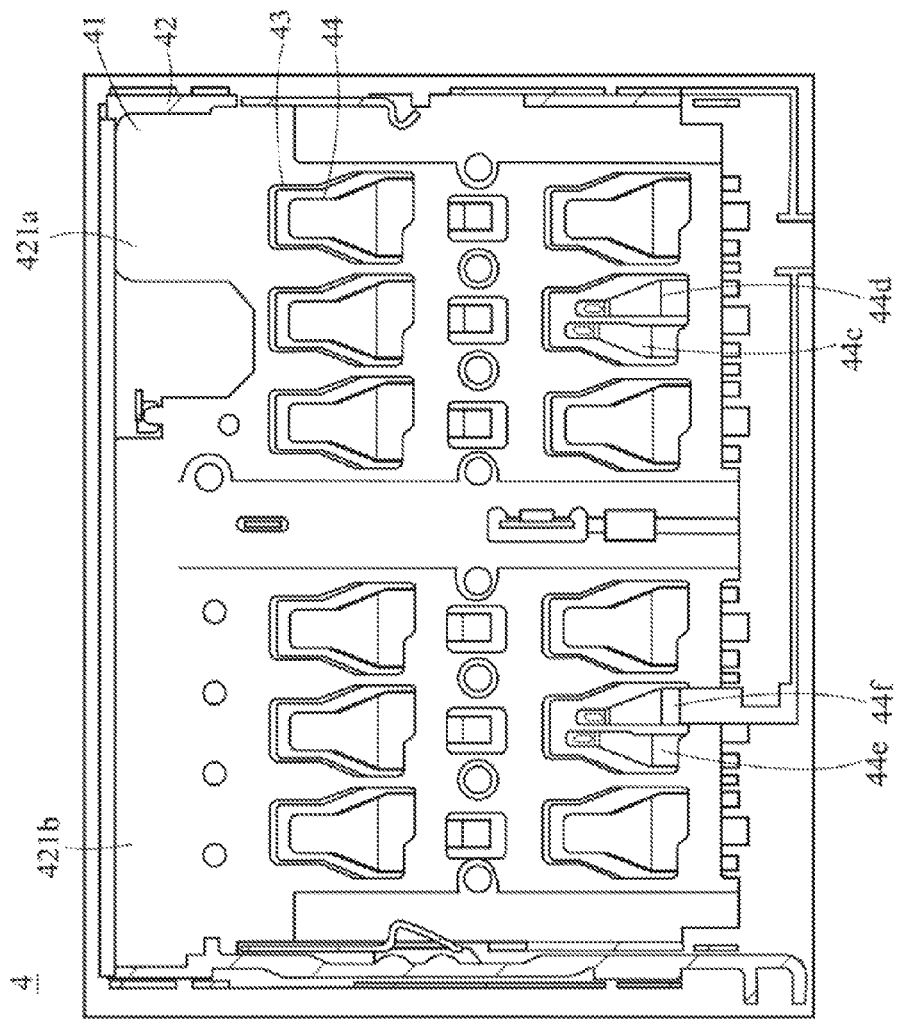
FIG. 4B is a schematic view of an electronic card connector of the push-pull type according to the present invention which is applied to multiple slots.

With reference to FIGS. 4A and 4B, FIG. 4A is a schematic view of a SIM card connector according to the fourth embodiment of the present invention, and FIG. 4B is a schematic view of a SIM card connector 4 which can receive several SIM cards 40 therein according to the embodiment of the present invention.

As shown in FIG. 4A and FIG. 4B, in the fourth embodiment, the SIM cards 40 are all fixed by the SIM card connector 4 of the push-pull type, and the SIM card connector 4 is a connector that can receive at least two SIM cards 40 therein.

The SIM card connector 4 has a base 41 and a frame 42, the base 41 is assembled with the frame 42 to form a receiving recess 421 (as shown in FIG. 4A), and then the receiving recess 421 is divided into a plurality of receiving regions depending on the number of the SIM cards 40 to be received. Taking FIG. 4B where the SIM card connector 4 is adapted to receive two SIM cards 40 as an example, the receiving recess 421 may be divided into a first receiving region 421a and a second receiving region 421b.

The receiving region 421 above the base 41 is provided with a plurality of through holes 43. At least one terminal 44 is supposed to pass through each of the through holes 43 correspondingly. Therefore, each of the through holes 43 is sized to allow a part of at least one terminal 44 to pass therethrough. Moreover, in the first receiving region 421a and the second receiving region 421b, at least one of the terminals 44 has a plurality of metal pins.

When the SIM card(s) 40 is (are) received in either or both of the first receiving region 421a and the second receiving region 421b, one of the metal pins 44c and 44d is adapted to be electrically connected with another of the metal pins via the sensing unit, and one of the metal pins 44e and 44f is adapted to be electrically connected with another of the metal pins via the sensing unit.

That is, when only a single SIM card 40 is received in the first receiving region 421a, the metal pin 44c is electrically connected with the metal pin 44d via the sensing unit. When the single SIM card 40 is received in the second receiving region 421b, the metal pin 44e is electrically connected with the metal pin 44f via the sensing unit. Additionally, when two SIM cards are respectively inserted into the first receiving region 421a and the second receiving region 421b at the same time, the metal pin 44c will be electrically connected with the metal pin 44d and the metal pin 44e will be electrically connected with the metal pin 44f correspondingly.

Similar to the aforesaid embodiments, the metal pin 44c of the first receiving region 421a and the metal pin 44e of the second receiving region 421b may each be set to be one of a Reset pin or a Ground pin, while the metal pin 44d of the first receiving region 421a and the metal pin 44f of the second receiving region 421b may each be set to be a Detect pin.

Thus, in the fourth embodiment, if only the first receiving region 421a has got the SIM card 40 placed therein, then the metal pin 44d (Detect pin) will be electrically connected with the metal pin 44c via the sensing unit after the SIM card 40 is placed in the first receiving region 421a. In this way, a signal indicating an electrical connection status may be generated by the system to determine whether a SIM card 40 is disposed in the SIM card connector 4. After generation of the signal indicating the electrical connection status, the system can perform data reading/writing operations on the SIM card 40 if the information carried in the signal is "Without SIM Card".

On the contrary, if neither the first receiving region 421a nor the second receiving region 421b of the SIM card connector 4 has a SIM card 40 received therein, then the metal pins 44d and 44f cannot be electrically connected with the SIM card, and no signal will be transmitted to the system. Thus, the system can know in advance that neither the first receiving region 421a nor the second receiving region 421b has a SIM card 40 received therein.

Thus, the system will not repeatedly attempt to detect whether the first receiving region 421a and the second receiving region 421b has a SIM card 40 received therein during operation unless the information "No SIM card" carried in the signal indicating the electrical connection status is received by the system. In this way, power consumption of the system is reduced.

Figure 4C:
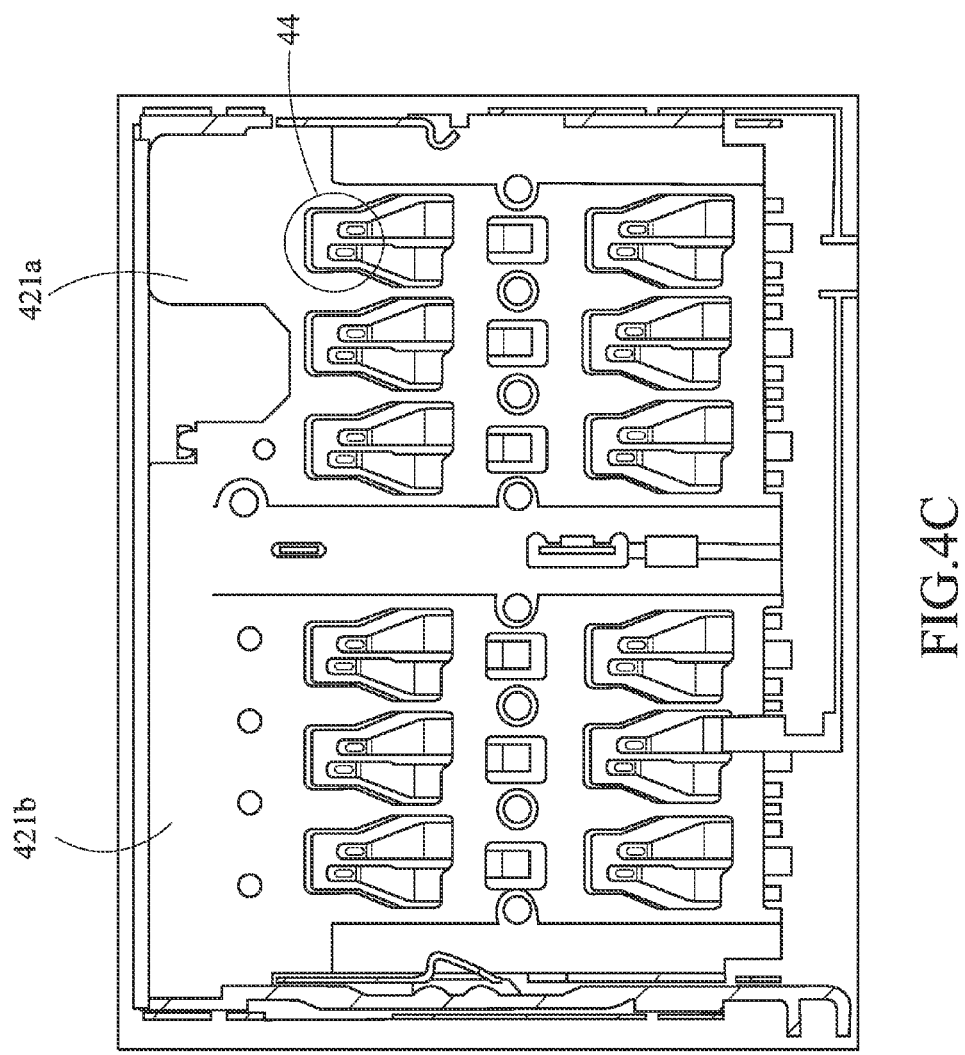
FIG. 4C is a schematic view of the plurality of metal pins of the electronic card connector in another configuration according to the present invention.

FIG. 4C illustrates another configuration of the metal pins 44a-44f according to the fourth embodiment of the present invention.

As shown in FIG. 4C, the terminals 44 in the first receiving region 421a and the second receiving region 421b are not limited to such an arrangement as shown in FIG. 4B that only a single terminal 44 is provided with a plurality of metal pins 44c-44f, but instead, each of all or part of the terminals 44 may be provided with a plurality of metal pins respectively so that the metal pins can be used for other extended functions.

Figure 5:
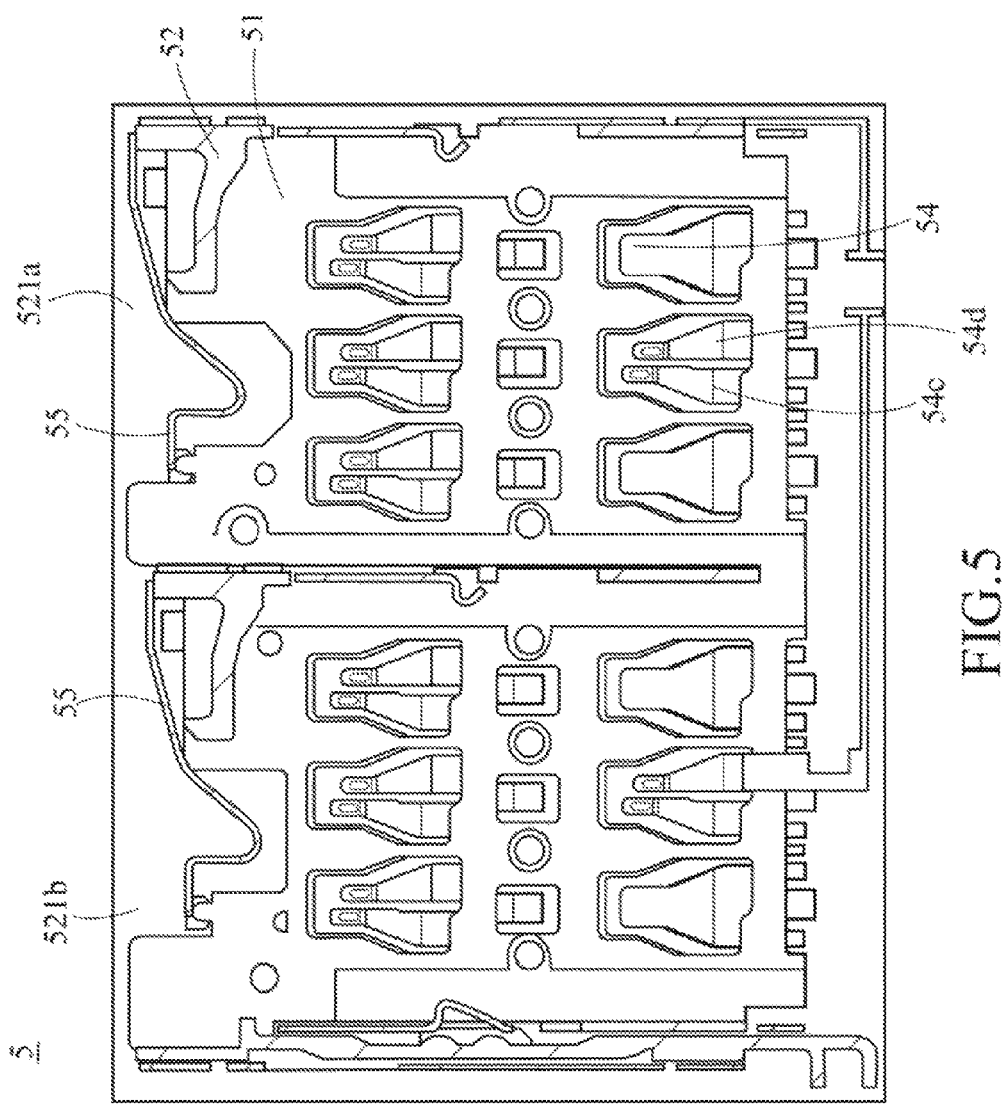
FIG. 5 is a schematic view of an electronic card connector of the push-push type according to the present invention which is applied to multiple slots.

FIG. 5 illustrates a schematic view of the fifth embodiment of the present invention in which the electronic card connector is a SIM card connector.

In the fifth embodiment, SIM cards (not shown) are all fixed by a SIM card connector of the push-push type, and the SIM card connector can receive several SIM cards therein. A SIM card connector 5 of the fifth embodiment is generally the same in structure as that of the fourth embodiment except that in the SIM card connector 5, the first receiving region 521a and the second receiving region 521b comprise an elastic sheet 55 respectively, and the elastic sheets 55 with elasticity are only used to fix or remove the SIM cards.

Figure 6:
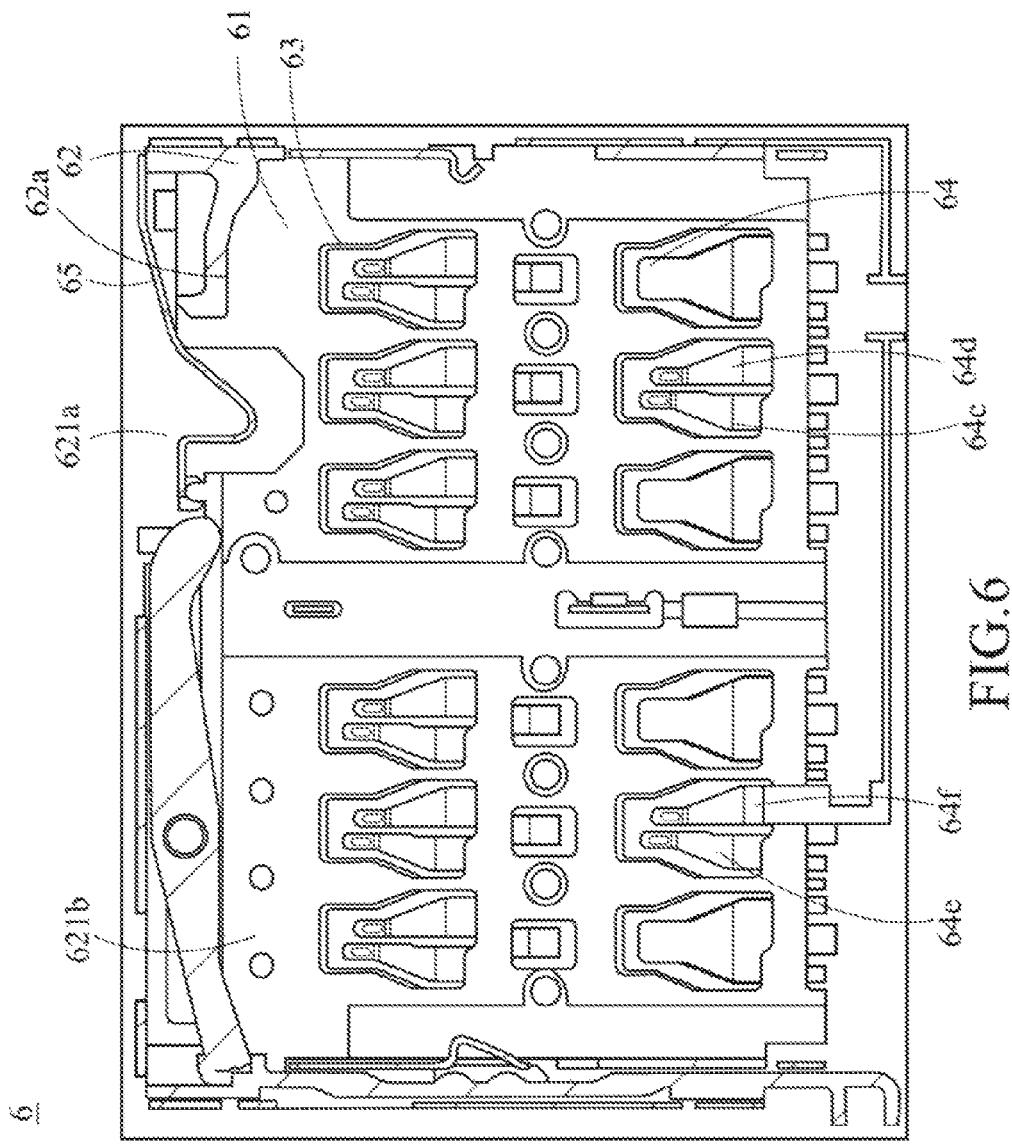
FIG. 6 is a schematic view of an electronic card connector of the tray type according to the present invention which is applied to multiple slots.

FIG. 6 illustrates a schematic view of the sixth embodiment of the present invention in which the electronic card connector is a SIM card connector.

In the sixth embodiment, a SIM card connector 6 is a SIM card connector of the tray type, and two SIM cards (not shown) are both fixed by the SIM card connector 6. Additionally, the SIM card connector 6 of the sixth embodiment is generally the same in structure as that of the fifth embodiment except that the SIM card connector 6 only needs one elastic sheet 65 to be disposed on the end surface 62a of the frame 62.

Therefore, when the SIM card(s) is (are) installed on either or both of the first receiving region 621a and the second receiving region 621b, the sensing unit determines whether the metal pins 64d and 64c of the first receiving region 621a are electrically connected with each other and whether the metal pins 64e and 64f of the second receiving region 621b are electrically connected with each other.

According to the above descriptions, the terminals of the SIM card connector of the present invention are provided with a plurality of metal pins. Thus, when a single SIM card is inserted into a single SIM card receiving recess or at least one SIM card is inserted into multiple SIM card receiving recesses, the disposing status(es) and the disposing region(s) of the SIM card(s) can be determined according to the electrical connection status between the metal pins before subsequent data reading/writing operations are performed. In this way, read retrying performed by the system on the receiving recesses of the SIM card during operation is avoided to reduce power consumption of the system and prolong the standby time of the device.

It shall be noted that although a SIM card is taken as an example of the electronic card in this application, the electronic card is not limited thereto. Accordingly, electronic cards with the storage function such as memory cards or financial cards also fall within the scope of the electronic card described in the present invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

BRIEF DESCRIPTION OF REFERENCE NUMERALS 1, 2, 3, 4, 5, 6: SIM card connector
10, 30, 40: SIM card
11, 21, 41, 51, 61: base
12, 22, 42, 52, 62: frame
13, 23, 43, 53, 63: through hole
14, 24, 44, 54, 64: terminal
14a-14d, 24c-24d, 44c-44f, 54c-54d, 64c-64f: metal pin
15: print circuit board (PCB)
16, 26: receiving recess
22a, 62a: end surface
25, 55, 65: elastic sheet
31: tray
311: receiving recess
312: electric card accommodating recess
421: receiving recess
421a, 521a, 621a: first receiving region
421b, 521b, 621b: second receiving region

What is claimed is:

1. An electronic card connector, being adapted to receive and be electrically connected with at least one electronic card, the electronic card connector comprising:
   a base, having a plurality of through holes;
   a frame, being adapted to be assembled with the base to form a receiving recess; and
   a plurality of terminals, being adapted to pass through the through holes, at least one of the terminals having a plurality of metal pins;
   wherein when the at least one electronic card is received in the receiving recess, one of the metal pins is adapted to be electrically connected with another of the metal pins via the at least one electronic card.

2. The electronic card connector of claim 1, further comprising a printed circuit board (PCB), wherein the terminals are arranged on the PCB and electrically connected with the PCB.

3. The electronic card connector of claim 1, wherein each of the terminals has a front tail and a back tail, and at least one of the metal pins having identical or different bending lengths is formed at the front tail along the back tail.

4. The electronic card connector of claim 1, wherein one of the metal pins is a Reset pin, and another of the metal pins is a Detect pin.

5. The electronic card connector of claim 1, wherein one of the metal pins is a Ground pin, and another of the metal pins is a Detect pin.

6. The electronic card connector of claim 1, wherein the at least one electronic card is adapted to abut against an end surface of the frame when the at least one electronic card is inserted into the receiving recess.

7. The electronic card connector of claim 1, further comprising an elastic sheet disposed on the frame.

8. The electronic card connector of claim 7, further comprising a tray, wherein the tray has an electronic card accommodating recess and the tray is adapted to be inserted into the receiving recess.

9. An electronic card connector, being adapted to receive and be electrically connected with at least one electronic card, the electronic card connector comprising:
   a base, having a plurality of receiving regions, each of the receiving regions having a plurality of through holes;
   a frame, being adapted to be assembled with the base to form a receiving recess; and
   a plurality of terminals, being adapted to pass through the through holes of the receiving regions, the terminals having a plurality of metal pins corresponding to the number of the through holes of the receiving regions;
   wherein when one of the at least one electronic card is received in one of the receiving regions, one of the metal pins is adapted to be electrically connected with another of the metal pins via the at least one electronic card.

10. The electronic card connector of claim 9, further comprising a PCB, wherein the terminals are arranged on the PCB and electrically connected with the PCB.

11. The electronic card connector of claim 9, wherein each of the terminals has a front tail and a back tail, and at least one of the metal pins having identical or different bending lengths is formed at the front tail along the back tail.

12. The electronic card connector of claim 9, wherein one of the metal pins of each of the receiving regions is a Reset pin, and another of the metal pins is a Detect pin.

13. The electronic card connector of claim 9, wherein one of the metal pins of each of the receiving regions is a Ground pin, and another of the metal pins is a Detect pin.

14. The electronic card connector of claim 9, wherein the at least one electronic card is adapted to abut against an end surface of the frame when the at least one electronic card is inserted into the receiving regions.

15. The electronic card connector of claim 9, wherein the receiving recess further comprises an elastic sheet disposed on the frame.

16. The electronic card connector of claim 15, further comprising a tray, wherein the tray has an electronic card accommodating recess and the tray is adapted to be inserted into the receiving recess.

\* \* \* \* \*